US007487455B2

(12) United States Patent
Szeto

(10) Patent No.: US 7,487,455 B2
(45) Date of Patent: Feb. 3, 2009

(54) TECHNIQUES FOR SIMULTANEOUSLY DISPLAYING A BACKGROUND PAGE AND AN INTERACTIVE CONTENT PAGE IN AN APPLICATION WINDOW

(75) Inventor: Christopher T. Szeto, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 568 days.

(21) Appl. No.: 10/828,513

(22) Filed: Apr. 19, 2004

(65) Prior Publication Data

US 2005/0235219 A1 Oct. 20, 2005

(51) Int. Cl.
*G06F 3/048* (2006.01)
*G06F 15/16* (2006.01)

(52) U.S. Cl. ................ 715/752; 715/777; 715/790; 715/758; 715/792; 709/206

(58) Field of Classification Search ................ 715/719, 715/766, 752, 777, 791, 758, 792, 794, 790; 709/206

See application file for complete search history.

(56) References Cited

U.S. PATENT DOCUMENTS

| 5,487,143 | A * | 1/1996 | Southgate ................ 715/790 |
| 5,555,365 | A * | 9/1996 | Selby et al. .............. 715/765 |
| 5,721,852 | A | 2/1998 | Porter et al. |
| 5,923,326 | A | 7/1999 | Bittinger et al. |
| 6,248,946 | B1 * | 6/2001 | Dwek ...................... 84/609 |
| 6,519,629 | B2 * | 2/2003 | Harvey et al. ............ 709/204 |
| 6,981,223 | B2 * | 12/2005 | Becker et al. ............ 715/753 |
| 7,000,008 | B2 * | 2/2006 | Bautista-Lloyd et al. .... 709/219 |
| 7,003,726 | B2 * | 2/2006 | Walker et al. ............ 715/717 |
| 7,016,968 | B2 * | 3/2006 | Willner et al. ........... 709/231 |
| 7,127,685 | B2 * | 10/2006 | Canfield et al. ........... 715/842 |
| 7,159,192 | B2 * | 1/2007 | Dobronsky ............... 715/835 |
| 7,275,215 | B2 * | 9/2007 | Werndorfer et al. ....... 715/752 |
| 2002/0070974 | A1 | 6/2002 | Barksdale et al. |
| 2002/0073108 | A1 * | 6/2002 | Morita et al. ............. 707/201 |
| 2002/0091762 | A1 | 7/2002 | Sohn et al. |
| 2002/0191027 | A1 | 12/2002 | Morrow et al. |
| 2003/0020750 | A1 * | 1/2003 | Brown et al. ............. 345/752 |
| 2003/0065721 | A1 * | 4/2003 | Roskind .................. 709/204 |
| 2004/0041841 | A1 * | 3/2004 | LeMogne et al. ......... 345/777 |
| 2004/0078424 | A1 * | 4/2004 | Yairi et al. ............... 709/203 |

(Continued)

OTHER PUBLICATIONS

Scott Werndorfer et al., Trillian Instant Messaging Program, Jun. 7, 2002, Cerulean Studios, Version 0.73, 3 pages screenshots.*

(Continued)

*Primary Examiner*—Tadesse Hailu
*Assistant Examiner*—Nicholas S Ulrich
(74) *Attorney, Agent, or Firm*—Brinks Hofer Gilson & Lione

(57) ABSTRACT

Techniques are provided for maintaining the visibility of a priority page in the background of a software application window while simultaneously displaying unrelated content from a content tab. The content displayed in the content tab can be obtained from a web page. A user can resize or minimize the content tab, but the background priority page is always visible in the window. The priority page can be a friends lists displayed in the background of an instant messenger application. Content from a content tab is simultaneously displayed in the instant messenger window with the friends list.

26 Claims, 3 Drawing Sheets

U.S. PATENT DOCUMENTS

2004/0145608 A1* 7/2004 Fay et al. .................... 345/758
2004/0212640 A1* 10/2004 Mann et al. ................. 345/792
2004/0267871 A1* 12/2004 Pratley et al. .............. 709/200
2005/0166154 A1* 7/2005 Wilson et al. .............. 715/751

OTHER PUBLICATIONS

Microsoft Comptuer Dictionary, 2002, Microsft Press, 5th edition, pp. 276 and 499.*
InternetRadioIndex.com, Oct. 2, 2002.*

* cited by examiner

TECHNIQUES FOR SIMULTANEOUSLY DISPLAYING A BACKGROUND PAGE AND AN INTERACTIVE CONTENT PAGE IN AN APPLICATION WINDOW

BACKGROUND OF THE INVENTION

The present invention relates to techniques for simultaneously displaying a background page and an interactive content page in an application window, and more particularly, to techniques for always displaying at least a portion of a background page in an application window while the application simultaneously displays content from a second content page.

The Internet offers various ways for users to communicate with other users, such as instant messaging. Instant messaging provides real-time communication between users within a closed community. Only registered users can send or receive messages via an instant messaging service. Users are required to sign in to the same system (or possibly the same server) with a pre-selected user name and password before sending messages.

An instant messaging software application typically allows a user to define a list of "friends" (i.e., other registered users with whom the user wishes to communicate) and to reject or ignore messages sent by other users. The list of friends is an important feature in an instant messaging application. A user can easily send an instant message to a friend in the friends list by clicking on that friend's username in the list. The friends list also indicates who is currently online and available to receive instant messages.

The list of friends is displayed when the user clicks a tab on the bottom of an instant messaging window. A user can click on other tabs at the bottom of the instant messaging window to view other web features. For example, clicking on a stock tab displays a list of current prices for a selected group of stocks. Clicking on a news tabs displays a list of hyperlinks to today's top news stories. The contents displayed in these other tabs is typically accessed from a web page.

The friends list is hidden when the instant messenger displays content from one of the other content tabs. As soon as the user clicks on one of these other content tabs, the user no longer has access to the important context of their friend's status. A user is therefore forced to choose between tracking the prices of their stocks and keeping an eye on their friends. For this reason, the features provided by these other tabs are greatly underutilized by IM users.

Therefore, it would be desirable to provide techniques for making a friends list visible while a user in an instant messaging environment views the content of other tabs.

BRIEF SUMMARY OF THE INVENTION

The present invention provides techniques for simultaneously displaying a priority background page and unrelated content from a content page in one software window. A user can minimize the content page, but the priority background page cannot be reduced to less than a minimum height. The content displayed in the content page can be interactive content obtained from a web page.

According to one embodiment of the present invention, the priority page is a list of friends displayed in a window by an instant messenger application. The list of friends remains visible in an instant messaging window while a content tab is simultaneously displayed in the window. The friends list is always visible in the window.

Other objects, features, and advantages of the present invention will become apparent upon consideration of the following detailed description and the accompanying drawings, in which like reference designations represent like features throughout the figures.

DETAILED DESCRIPTION OF THE INVENTION

The present invention provides techniques for simultaneously displaying a priority page in one software window with a second content page. The user can view the second content page by clicking on a tab. The user can move and resize the second content page, but the software application prevents the user from hiding the priority page. Thus, the priority page is always visible in the background of the application window. The simultaneous display of the priority page and the second page allows a user to interact more easily with features on each page.

According to one embodiment of the present invention, an instant messenger application displays a friends list as the priority page. A user's friends in an instant messaging community are displayed in the friends list. The instant messenger also allows the user to view unrelated content from a second page, while simultaneously viewing contacts in the friends list in one window. Content from the second page is accessed from a web page through the Internet. Both the priority page and the second page can be interactive pages that are editable by a user.

Content on the second page can be, for example, stock quotes, weather reports, songs, or recent news stories. The second page is displayed when the user selects a tab in a tab selector region of the window. The instant messenger always maintains the friends list visible while the user views content from any of the tabs.

This embodiment of the present invention allows a user to monitor his/her friends while simultaneously viewing unrelated content from other tabs in one window. Also, a user can more easily compose instant messages to friends regarding content of the second content page when the friends list and the second content page are displayed simultaneously in the instant messenger window.

Although the present invention is discussed primarily in the context of a friends list in an instant messenger application, it should be understood that the present invention applies to other contexts as well that do not involve instant messaging.

Figure 1A:
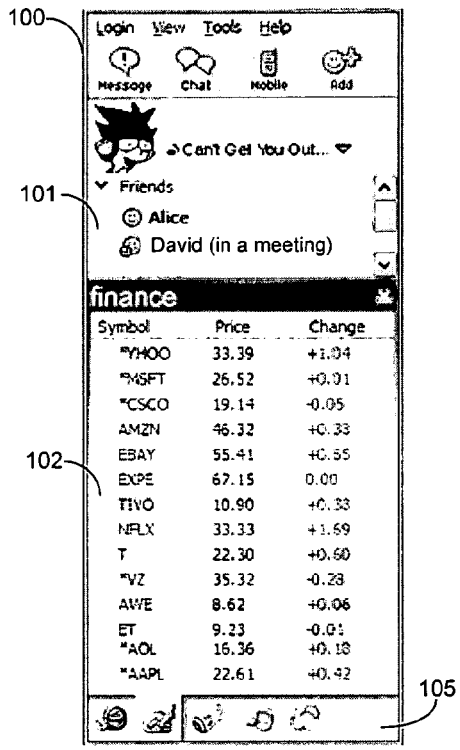
FIGS. 1A-1B illustrate examples of instant messenger windows that display a friends list simultaneously with content from a content tab in one window according to embodiments of the present invention.
Figure 1B:
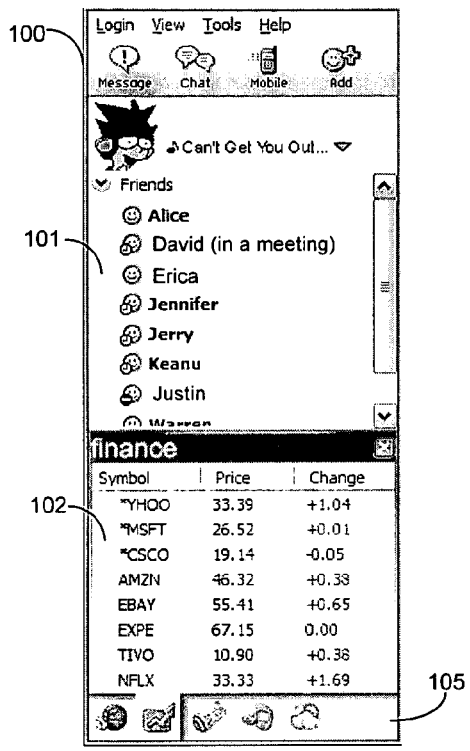
Figure 1C:
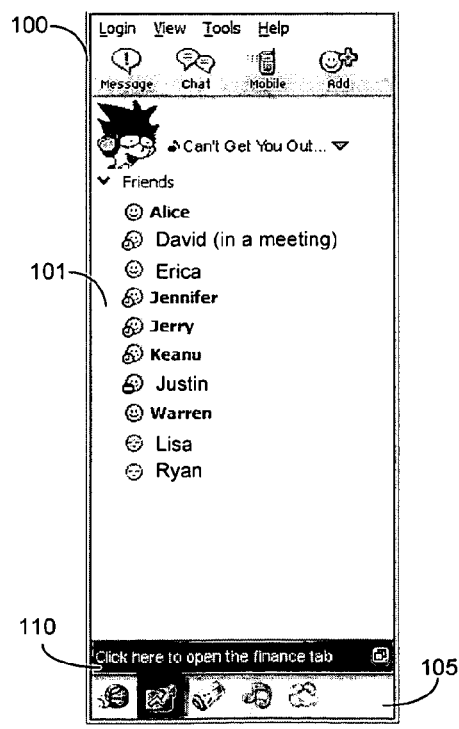
FIG. 1C illustrates how a minimized content tab looks in an instant messenger window displaying a friends list according to an embodiment of the present invention.

FIGS. 1A-1C illustrate examples of the features of the present invention. Window 100 in FIGS. 1A-1C is a window that is generated by an instant messenger application. Window 100 displays a friends list 101 and tab container 102. Friends list 101 includes a list of people in the user's instant messenger community. The user can communicate with people in the friends list through the instant messenger application. Tab container 102 includes contents from a personalized content tab.

Window 100 also includes five tab selectors displayed in region 105. Each tab selector displays an icon that is specified as an attribute of its tab. The tab can specify different icons that are optimized for a particular skin. Rolling over the tab selector displays a tooltip with the tab's name.

If a user clicks any tab selector when the tab container is closed, the tab container is automatically opened to display the tab. This is a shortcut so that the user does not have to first use the collapse/expend toggle to open the tab container.

Tab container 102 displays personalized stock quotes in FIGS. 1A-1B. A user can select one of the other four tabs selectors shown in region 105 to display personalized content from another content tab in tab container 102. When another tab is selected, the content of the stock quotes tabs is hidden, and content from the newly selected tab is displayed in window 100.

According to the present invention, tab container 102 and the friends list 101 are displayed simultaneously in window 100. Only one of the content tabs can be displayed in window 100 at once. Friends list 101 is not a tab in window 100. Friends list 100 is a background page that is always visible in window 100 no matter what tab is selected in region 105.

When the user selects one of the tab selectors in region 105, content from the selected tab is displayed in window 100 without totally obscuring friends list 101. The instant messenger application sets a minimum height for friends list 101. The instant messenger application prevents the user from reducing the height of friends list 101 below its minimum height.

In FIG. 1A, tab container 102 is displayed in the bottom ⅔ of window 100, and friends list 101 is displayed in a small region near the top of window 100. FIG. 1A illustrates an example of a minimum height for friends list 101. The instant messenger application prevents the height of content tab 102 from being increased above the height shown in FIG. 1A so that at least a portion of friends list 101 is always visible in window 100.

A user can shrink tab container 102, as shown in FIG. 1B. By shrinking tab container 102, more of friends list 101 becomes visible. A user can resize tab container 102 as desired, except that the user is prevented from shrinking the height of friends list 101 below the minimum height. Each tab that is selected from tab selector 105 can have a different height.

The tabs can also have a minimum height so that it is not possible for a user to resize the tab such that it looks closed. A tab cannot be resized to a height that is greater than the tab's maximum height. There are usually no constraints on a tab's width.

A user can minimize or hide tab container 102 so that none of its content is visible, as shown in FIG. 1C. When content tab 102 is minimized, friends list 101 is maximized in window 100. Header bar 110 of tab 102 is always visible so that the user can increase the size of content tab 102 at a later time.

Figure 2A:
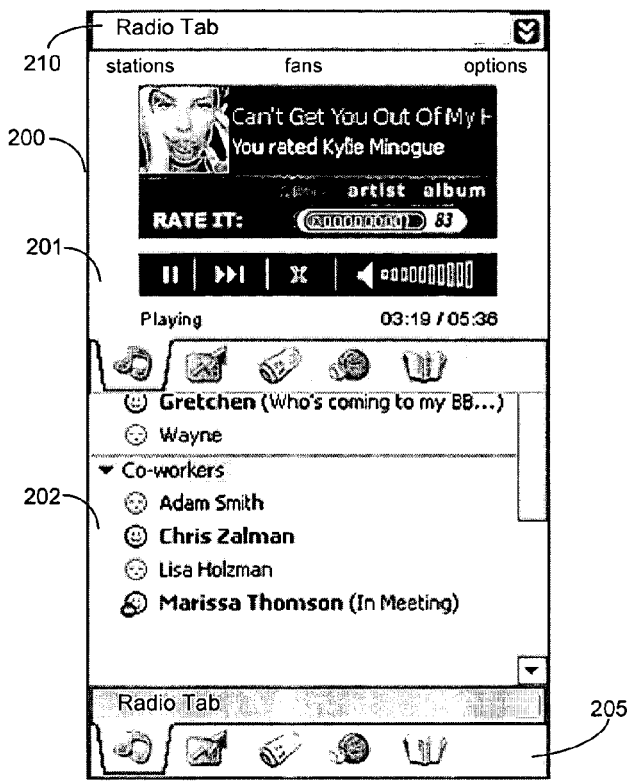
FIG. 2A illustrates another view of an instant messenger window that simultaneously displays a friend's list and content from a content tab according to an embodiment of the present invention.

FIG. 2A illustrates another example of the present invention. Window 200 is also generated by an instant messenger application. Window 200 displays content tab 201 and friends list 202. Content tab 201 is a Radio tab that plays music. Tab 201 also displays content related to music. In FIG. 2A, tab 201 displays information for a song that is currently playing including a song title, artist, time remaining, and an image. Tab 201 allows a user to start and stop the audio sound.

Content tab 201 is displayed in the top portion of window 200, and friends list page 202 is displayed in the bottom portion of window 200. As FIG. 2A illustrates, a content tab can be displayed in any portion of an instant messenger window (top, bottom, or middle) as long as a portion of the friends list 202 remains visible. A user can click on the top portion 210 of radio tab 201 and drag the tab up or down within window 200.

A user can also resize tab 201. The height of tab 201 can be increased up to a minimum height. The instant messenger prevents friends list 202 from being totally hidden behind a content tab.

A user can view other tab containers by clicking one of the tabs in region 205. An instant messenger application of the present invention can provide numerous types of content pages, such as a finance tab, a calendar tab, a news tab, a sports tab, a weather tab, an alerts tab, a games tab, a bookmarks tab, a travel tab, an auctions tab, and an address book tab. Preferably, only one of these tabs can be displayed simultaneously with the friends list in one instant messenger window. However, in further embodiments, multiple content pages can be displayed simultaneously with a background page.

Tabs in tab selector 205 can be ordered based on frequency of usage. The user has the option to hide or delete certain tabs from tab selectors 205. Preferably, the instant messenger application prevents a user from deleting all of the tabs from tab selector 205. A user can also add tabs to tab selectors 205.

A user can hide the tab container 201 and tab selectors 205. If the user activates a feature that requires content tabs, but the content tabs have been hidden, the instant messenger application makes content tabs visible again to fulfill the user's request. For example, if the user has chosen to hide the content tabs, but selects "Start My Radio," the Radio tab 201 and tab selectors 205 become visible again in window 200.

The instant messenger application can be programmed with default tabs that are displayed in the absence of preferences set by the user. The instant messenger application can also have default tab settings that cannot be overridden by the user.

When a tab is closed or hidden, only the title of the tab and relevant sizing controls are visible in the instant messenger window as shown in FIG. 1C. None of the tab's contents is visible, maximizing the number of contacts visible in the friends list for the current application window's height. Clicking the appropriate control on the tab's title bar opens the tab and resizes the selected content tab to its list-used height. Clicking the tab selector when the tab is closed reopens the tab area, restoring the selecting tab to its last-used height. Tabs can also have scroll bars that allow a user to scroll up and down to view additional content in a tab.

Figure 2B:
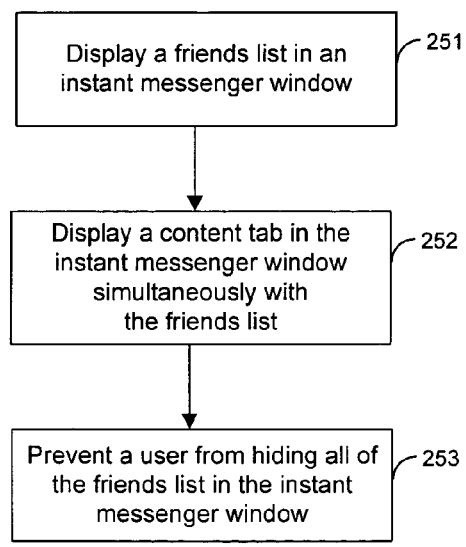
FIG. 2B illustrates a process for simultaneously displaying a friends list and a content tab according to an embodiment of the present invention.

FIG. 2B illustrates a process for simultaneously displaying a friends list and a content tab according to an embodiment of the present invention. At step 251, an instant messenger application displays a friends list in the background of an instant messenger window. At step 252, the instant messenger application displays a content tab in the instant messenger window simultaneously with the friends list, as shown, for example, in FIGS. 1A, 1B, and 2A. Step 252 can be performed when the user selects a tab in the tab selector region. At step 253, the instant messenger application prevents the user from hiding all of the friends list in the instant messenger window. For example, the instant messenger application prevents the user from reducing the size of the friends list below a minimum height.

Figure 3:
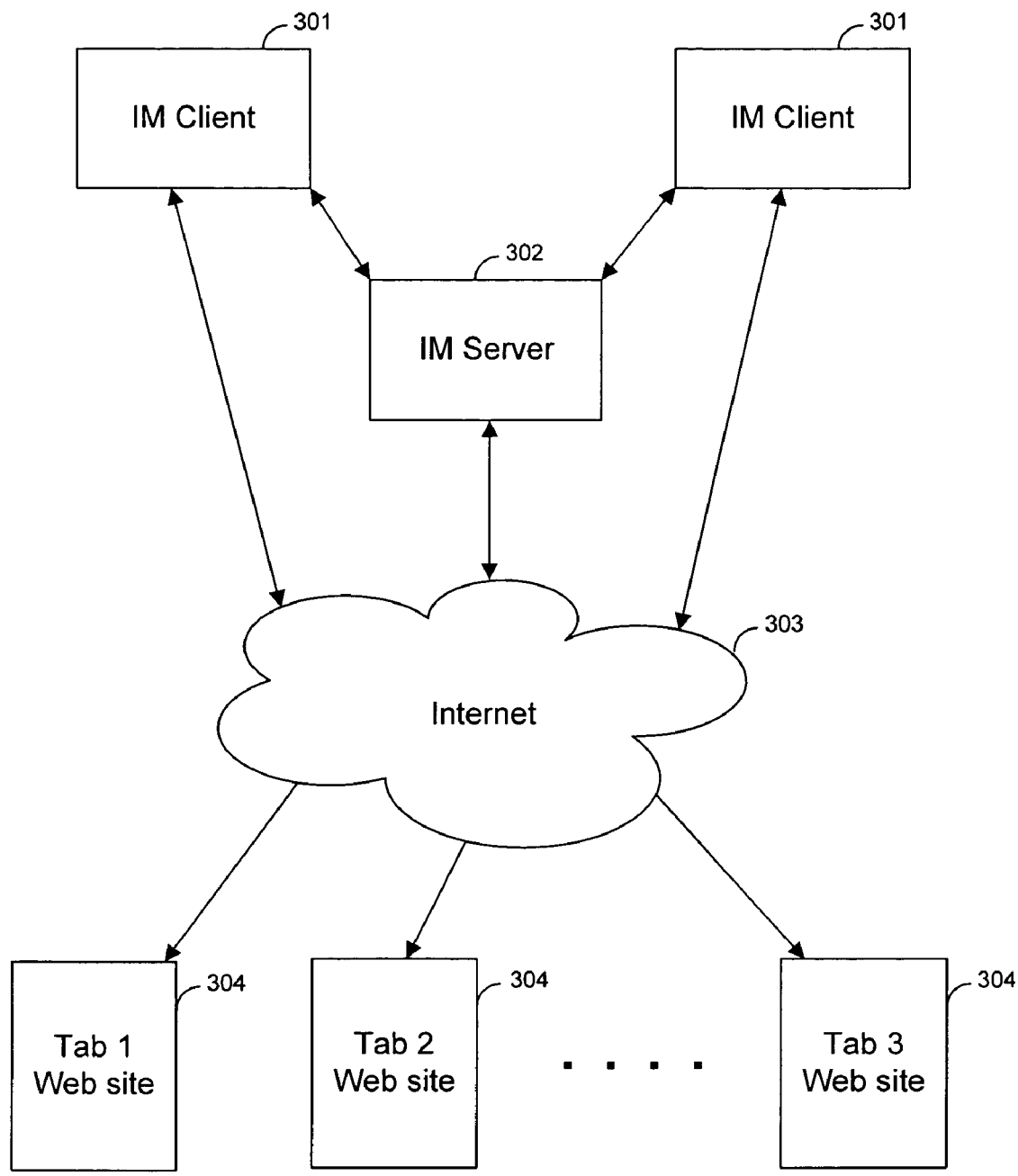
FIG. 3 is a diagram of a system that implements embodiments of the present invention.

FIG. 3 illustrates an example of a system that implement embodiments of the present invention. The system includes an instant messenger (IM) server 302 and instant messaging clients such as IM clients 301. Only two IM clients 301 are shown in FIG. 3 for simplicity. However, server 302 can communicate with many more IM clients 301. An IM client 301 launches an IM application to communicate with IM applications on other IM clients through IM server 302. IM server 302 transmits instant messages between the IM clients.

The contents inside the content tabs displayed in an instant messenger window are accessed from web pages. Each tab contains a browser control. Each client 301 can access web sites 304 for the tabs directly through the Internet 303 using the browser control. IM clients 301 access web sites 304 for each of the tabs through the Internet 303 as shown in FIG. 3.

A client 301 can reload the contents of a tab by downloading data from the corresponding web site. Each tab in an IM window can update itself appropriately so as not to force users to manually trigger a refresh. The contents of a tab can also be refreshed manually when the user selects a refresh option.

A tab can have multiple attributes that define its behavior. For example, each tab has a name that is displayed in the tab title bar. Each tab can have a unique identification number that is used by the client IM application to identify the tab and also for reporting statistics about how often the tab is used. A tab can also have a content URL that specifies what web page to load inside the tab.

A tab can also have a tab image that is displayed in the tab selector region. A tab can also have a default height that is used the first time the user selects the tab a particular client machine. Thereafter, when the user selects the tab, the last height of the tab is used. A tab can also have a maximum and minimum height as discussed above.

A tab can also specify the behavior for hyperlinks inside the tab. If enable browsing is activated, hyperlinks are opened inside of the tab itself (within the IM window). Otherwise, the tab spawns new browser windows when the user clicks on a hyperlink inside the tab.

A tab can also be specified as a persistent tab. A persistent tab, once started, is not unloaded until the user signs out of the instant messenger client application. The Radio tab is an example of a persistent tab. Once a user starts the Radio tab and is listening to a radio station, switching to another tab does not disrupt the music audio.

A tab can specify whether or not it will be refreshed when the user selects a refresh option or button. A tab can be declared a trusted tab by including a signature that proves that the tab is trusted. The signature verifies that the content URL and the tab ID are indeed from a trusted Internet service or web page. Trusted tabs gain access to certain methods of the Tab JavaScript API.

Only trusted tabs can have access to a selected object, which is an array of contacts that are currently selected in the friends list. Only a trusted tab can receive contact selection events, query the instant messenger for more detailed information about a contact (such as data in the address book), and change the title of the tab in the tab title bar.

The purpose of trusted tabs having access to special functions is to build new functional tabs. For example, a new calendar tab can allow the user to select a friend or a contact and then click a button in the tab to invite the friend to a meeting.

The instant messenger can keep track of statistics relating to tab usage. For example, the instant messenger can count the number of times that the tab was switched to. The instant messenger can also keep track of the amount of time that a tab was open. These statistics help to determine what tabs are most frequently used.

The present invention also allows a user to add a tab to an instant messenger window. Tab definitions are hosted by IM server 302. A client IM application retrieves new tabs from server 302 and installs the tabs as necessary. Third parties can host a link on a web page to help IM users install new IM tabs that may come out in the future through IM server 302.

According to another embodiment of the present invention, the instant messenger allows interaction between two pages, by concurrently displaying both the Friend List and a Content Tab. Interaction between two pages can involve communications between two IM users. For example, in the Messenger context, a user can drag a news article (from the news tab) over to a friend in the Friend List to open an IM window to that friend and to send the URL of the news article to the selected friend. As another example, a user can select a friend in the Friend List, and then select a game in a Games Tab to trigger an invitation to that Friend to play the game.

While the invention has been described with respect to specific embodiments, one skilled in the art will recognize that numerous modifications are possible. The various components of an instant messaging system may be implemented using hardware components, programmable devices (e.g., microprocessors) executing software instructions, and any combination thereof. "Instant messaging" as used herein is not limited to any particular protocol, format, delivery method, or form factor and includes messages delivered according to any protocol that enables communication among a closed community of authenticated users. Thus, although the invention has been described with respect to specific embodiments, it will be appreciated that the invention is intended to cover all modifications and equivalents within the scope of the following claims.

What is claimed is:

1. A method for displaying multiple pages in an instant messenger application, the method comprising:
    displaying simultaneously a first page and a second page in the instant messenger window;
    wherein the first page is a friends list page that displays a set of users that send and receive a plurality of instant messages within an instant messaging community and the second page is a interactive content page with a set of tabs for retrieving content from the internet;
    allowing a user in the set of users to change the size of the interactive content page, wherein the interactive content page has a minimum height and a maximum height;
    preventing a user in the set of users from hiding all of the friends list page from view in the instant messenger window by maintaining a pre-programmed minimum height for the friends list page within the instant messenger window; and
    sending a message from a first instant messenger user to a second instant messenger user in the friends list in response to the first instant messenger user selecting content in the interactive content page, wherein the message relates to the selected content.

2. The method as defined in claim 1 wherein preventing the user in the set of users from hiding all of the friends list page from view further comprises preventing the user in the set of users from shrinking a visible portion of the friends list page to less than the preprogrammed minimum height for the friends list page.

3. The method as defined in claim 1, wherein retrieving content from the internet further comprises automatically refreshing the content.

4. The method as defined in claim 1, wherein displaying simultaneously a first page and a second page in the instant messenger window further comprises displaying within the interactive content page the content of a first tab in the set of tabs when the user in the set of users selects the first tab in the set of tabs.

5. The method as defined in claim 4 further comprising:
displaying within the interactive content page the content of a second tab in the set of tabs when the user in the set of users selects a second tab in the set of tabs, the second tab being displayed at the same time that at least a portion of the friends list page is also displayed in the instant messenger window.

6. The method as defined in claim 5 further comprising:
hiding the content of the first tab when the content of the second tab is displayed within the interactive content page.

7. The method as defined in claim 6, wherein the content of the second tab overlaps the content of the first tab in the interactive content page.

8. The method as defined in claim 1 further comprising:
minimizing the interactive content page in response to a user request so that the content is not visible in the instant messenger window.

9. The method as defined in claim 1 further comprising:
resizing the friends list page when the interactive content page is resized, wherein a size of the friends list page changes inversely proportionate to the size of the interactive content page.

10. The method of claim 1, wherein the set of tabs comprises a persistent tab.

11. The method of claim 1, wherein the set of tabs comprises a trusted tab.

12. The method of claim 4, wherein the first tab comprises a tab image that is displayed in the instant messenger window.

13. The method of claim 5, wherein the first tab and the second tab are ordered in the set of tabs based on a frequency of usage.

14. The method of claim 1, wherein selecting content in the interactive content page further comprises dragging the content from the interactive content page to the second instant messenger user listed in the friends list page.

15. The method of claim 1, wherein sending a message from a first instant messenger user to a second instant messenger user in response to the first instant messenger user selecting content in the interactive content page further comprises:
including the selected content in the message.

16. A computer program product stored on a computer readable medium that simultaneously displays multiple pages in one window, the computer program product comprising:
code for displaying simultaneously a first page and a second page in the instant messenger window;
wherein the first page is a friends list page that displays a set of users that send and receive a plurality of instant messages within an instant messaging community and the second page is a interactive content page with a set of tabs for retrieving content from the internet;
code for displaying within the interactive content page the content of a first tab when a user in the set of users selects a first tab in the set of tabs;
code for allowing a user in the set of users to change the size of the interactive content page, wherein the interactive content page has a minimum height and a maximum height;
code for preventing a user in the set of users from hiding all of the friends list page from view in the instant messenger window by maintaining a pre-programmed minimum height for the friends list page within the instant messenger window; and
code for sending a message from a first instant messenger user to a second instant messenger user in the friends list in response to the first instant messenger user selecting content in the interactive content page, wherein the message relates to the selected content.

17. The computer program product according to claim 16 wherein the code for preventing the user in the set of users from hiding all of the friends list page from view further comprises code for preventing the user in the set of users from shrinking a visible portion of the friends list page to less than a preprogrammed minimum height for the friends list page.

18. The computer program product according to claim 16, wherein retrieving content from the internet further comprises automatically refreshing the content.

19. The computer program product according to claim 16 further comprising:
code for displaying within the interactive content page the content of a second tab in the set of tabs when the user in the set of users selects a second tab in the set of tabs, the second tab being displayed at the same time that at least a portion of the friends list page is also displayed in the instant messenger window.

20. The computer program product according to claim 19, wherein the content of the second tab overlaps the content of the first tab in the interactive content page.

21. The computer program product according to claim 20 further comprising:
code for hiding the content of the first tab when the content of the second tab is displayed within the interactive content page.

22. The computer program product according to claim 16 further comprising:
code for minimizing the interactive content page in response to a user request so that the content is not visible in the instant messenger window.

23. The method of claim 16, wherein code for sending a message from a first instant messenger user to a second instant messenger user in response to the first instant messenger user selecting content in the interactive content page further comprises:
including the selected content in the message.

24. The method of claim 16, wherein the first tab comprises a tab image that is displayed in the instant messenger window.

25. The method of claim 19, wherein the first tab and the second tab are ordered in the set of tabs based on a frequency of usage.

26. The method of claim 16, wherein selecting content in the interactive content page further comprises dragging the content from the interactive content page to the second instant messenger user listed in the friends list page.

* * * * *